United States Patent
Lombardo et al.

(10) Patent No.: US 11,720,621 B2
(45) Date of Patent: Aug. 8, 2023

(54) SYSTEMS AND METHODS FOR NAMING OBJECTS BASED ON OBJECT CONTENT

(71) Applicant: Apple Inc., Cupertino, CA (US)

(72) Inventors: Eric M. Lombardo, Cranberry Township, PA (US); Scott G. Marnik, Pittsburgh, PA (US); Ryan John Poling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/426,736

(22) Filed: May 30, 2019

(65) Prior Publication Data

US 2020/0301960 A1  Sep. 24, 2020

Related U.S. Application Data

(60) Provisional application No. 62/820,078, filed on Mar. 18, 2019.

(51) Int. Cl.
| | |
|---|---|
| *G06F 16/45* | (2019.01) |
| *G06F 16/483* | (2019.01) |
| *G06N 20/00* | (2019.01) |
| *G06F 16/906* | (2019.01) |
| *G06F 16/9032* | (2019.01) |
| *G06F 16/438* | (2019.01) |

(52) U.S. Cl.
CPC .......... *G06F 16/45* (2019.01); *G06F 16/4393* (2019.01); *G06F 16/483* (2019.01); *G06F 16/906* (2019.01); *G06F 16/90328* (2019.01); *G06N 20/00* (2019.01)

(58) Field of Classification Search
CPC .... G06F 16/45; G06F 16/4393; G06F 16/906; G06F 16/483; G06F 16/90328; G06N 20/00
See application file for complete search history.

(56) References Cited

U.S. PATENT DOCUMENTS

| | | | | |
|---|---|---|---|---|
| 7,849,141 | B1 * | 12/2010 | Bellegarda | G06Q 10/107 709/206 |
| 8,132,099 | B2 * | 3/2012 | Asakawa | G06F 40/103 715/271 |
| 8,239,460 | B2 * | 8/2012 | Meek | G06Q 10/10 709/206 |
| 8,478,052 | B1 * | 7/2013 | Yee | G06V 10/464 707/E17.02 |

(Continued)

*Primary Examiner* — Jeremy L Stanley
(74) *Attorney, Agent, or Firm* — Fletcher Yoder PC

(57) ABSTRACT

Systems, methods, and devices are provided for determining descriptive object names for display on a graphical user interface (GUI). The method may include detecting an input to insert an object into a portion of an application file. The object includes content and has a first metadata name. The method may also include generating a classification label for the object using a content classifier machine learning model, such that the classification label describes the object contents. The method may also further involve updating the first metadata name of the object to a second metadata name that comprises the classification label. Further, the method may also include displaying the second metadata name of the object in an object list of the application file. The object list may enumerate one or more objects of the portion of the application file.

20 Claims, 10 Drawing Sheets

(56) References Cited

U.S. PATENT DOCUMENTS

| | | | |
|---|---|---|---|
| 8,843,424 B2* | 9/2014 | Mei | G06K 9/6257 |
| | | | 706/20 |
| 9,111,579 B2* | 8/2015 | Meaney | G11B 27/031 |
| 9,613,296 B1* | 4/2017 | Rosen | G06K 9/6256 |
| 9,852,377 B1* | 12/2017 | Kumar | G06N 5/04 |
| 10,176,198 B1* | 1/2019 | Dhua | G06K 9/627 |
| 10,222,942 B1* | 3/2019 | Zeiler | G06F 40/30 |
| 10,303,720 B2* | 5/2019 | Kirk | G06Q 10/107 |
| 10,395,108 B1* | 8/2019 | Geng | G06F 16/56 |
| 10,423,826 B2* | 9/2019 | Nepomniachtchi | G06K 9/2063 |
| 10,496,884 B1* | 12/2019 | Nguyen | G06K 9/6272 |
| 10,515,125 B1* | 12/2019 | Lavergne | G06F 16/316 |
| 10,528,597 B2* | 1/2020 | Kohlmeier | G06F 16/285 |
| 10,719,301 B1* | 7/2020 | Dasgupta | G06K 9/6267 |
| 10,909,401 B2* | 2/2021 | Burachas | G06F 16/53 |
| 11,106,715 B1* | 8/2021 | Ju | G06F 16/35 |
| 2003/0167402 A1* | 9/2003 | Stolfo | H04L 51/12 |
| | | | 726/23 |
| 2005/0027664 A1* | 2/2005 | Johnson | G06F 40/45 |
| | | | 706/12 |
| 2006/0041564 A1* | 2/2006 | Jain | G06F 16/907 |
| 2007/0094600 A1* | 4/2007 | Sullivan | G06F 16/16 |
| | | | 715/711 |
| 2007/0143284 A1* | 6/2007 | Lee | G06F 40/44 |
| 2009/0006285 A1* | 1/2009 | Meek | G06Q 10/10 |
| | | | 706/12 |
| 2011/0145327 A1* | 6/2011 | Stewart | G06F 16/58 |
| | | | 709/203 |
| 2011/0270834 A1* | 11/2011 | Sokolan | G06F 40/20 |
| | | | 707/737 |
| 2012/0233110 A1* | 9/2012 | Balinsky | G06F 16/51 |
| | | | 706/52 |
| 2012/0278705 A1* | 11/2012 | Yang | G06F 40/258 |
| | | | 715/254 |
| 2012/0314941 A1* | 12/2012 | Kannan | G06K 9/6227 |
| | | | 382/161 |
| 2013/0272575 A1* | 10/2013 | Li | G06K 9/4671 |
| | | | 382/103 |
| 2014/0096092 A1* | 4/2014 | Johnson | G06F 3/04883 |
| | | | 715/863 |
| 2014/0146053 A1* | 5/2014 | Cragun | G06F 16/5866 |
| | | | 345/467 |
| 2014/0149376 A1* | 5/2014 | Kutaragi | G06F 16/532 |
| | | | 707/706 |
| 2014/0201113 A1* | 7/2014 | Harz | G06N 20/00 |
| | | | 706/12 |
| 2015/0178383 A1* | 6/2015 | Corrado | G06F 16/50 |
| | | | 707/740 |
| 2016/0092730 A1* | 3/2016 | Smirnov | G06K 9/00456 |
| | | | 382/195 |
| 2016/0147434 A1* | 5/2016 | Lee | G06F 3/0482 |
| | | | 715/838 |
| 2016/0269334 A1* | 9/2016 | DeSouza Sana | G06Q 10/107 |
| 2016/0364419 A1* | 12/2016 | Stanton | G06F 16/2453 |
| 2017/0091153 A1* | 3/2017 | Thimbleby | G06K 9/00402 |
| 2017/0132526 A1* | 5/2017 | Cohen | G06N 5/022 |
| 2017/0140051 A1* | 5/2017 | Ball | H04L 51/32 |
| 2017/0140250 A1* | 5/2017 | Maloney | G06T 11/60 |
| 2017/0140297 A1* | 5/2017 | Karumanchi | G06N 20/00 |
| 2017/0177584 A1* | 6/2017 | Narasimha | H04N 21/235 |
| 2017/0192958 A1* | 7/2017 | Misra | G06F 40/30 |
| 2017/0220605 A1* | 8/2017 | Nivala | G06F 16/9024 |
| 2017/0243077 A1* | 8/2017 | Fukui | G06K 9/4676 |
| 2017/0278015 A1* | 9/2017 | Miranda | G06N 20/00 |
| 2017/0295118 A1* | 10/2017 | Kirk | H04L 51/02 |
| 2017/0351934 A1* | 12/2017 | Ruan | G06F 16/50 |
| 2017/0372408 A1* | 12/2017 | Khandelwal | G06Q 30/0641 |
| 2018/0075323 A1* | 3/2018 | Kouchnir | G06F 16/951 |
| 2018/0121825 A1* | 5/2018 | Kumar | G06F 40/56 |
| 2018/0137119 A1* | 5/2018 | Li | H04N 5/23219 |
| 2018/0137560 A1* | 5/2018 | Chopra | G06Q 30/0643 |
| 2018/0181832 A1* | 6/2018 | Wu | G06Q 50/01 |
| 2018/0196697 A1* | 7/2018 | Standefer | G06Q 10/063112 |
| 2018/0246846 A1* | 8/2018 | Takimoto | G06N 20/00 |
| 2018/0276561 A1* | 9/2018 | Pasternack | G06N 20/00 |
| 2018/0285321 A1* | 10/2018 | Antony | G06F 40/18 |
| 2018/0285773 A1* | 10/2018 | Hsiao | G06Q 30/04 |
| 2018/0330206 A1* | 11/2018 | Shyshkov | G06K 9/00456 |
| 2018/0336574 A1* | 11/2018 | Mohan | G06Q 30/0201 |
| 2018/0349450 A1* | 12/2018 | Smyth | G06F 3/0485 |
| 2018/0359107 A1* | 12/2018 | Asher | G06N 3/08 |
| 2018/0373980 A1* | 12/2018 | Huval | G06K 9/00805 |
| 2019/0042880 A1* | 2/2019 | Yeager | G06K 9/6222 |
| 2019/0114047 A1* | 4/2019 | Kikin-Gil | G06T 11/60 |
| 2019/0138610 A1* | 5/2019 | Taleghani | G06Q 50/01 |
| 2019/0163768 A1* | 5/2019 | Gulati | G06F 16/9535 |
| 2019/0250891 A1* | 8/2019 | Kumar | G06F 8/34 |
| 2019/0272419 A1* | 9/2019 | Reihl | G06K 9/00463 |
| 2019/0294665 A1* | 9/2019 | Matskevich | G06F 40/279 |
| 2019/0325259 A1* | 10/2019 | Murphy | G06K 9/6259 |
| 2019/0325626 A1* | 10/2019 | Tao | G06F 40/109 |
| 2019/0373322 A1* | 12/2019 | Rojas-Echenique | |
| | | | G06N 3/0454 |
| 2019/0392035 A1* | 12/2019 | Indenbom | G06F 40/284 |
| 2020/0004561 A1* | 1/2020 | Kottler | G06N 5/046 |
| 2020/0004815 A1* | 1/2020 | Weisberg | G06K 9/00469 |
| 2020/0005065 A1* | 1/2020 | Palm | G06K 9/2081 |
| 2020/0012943 A1* | 1/2020 | Neves | G06K 9/6215 |
| 2020/0026966 A1* | 1/2020 | Nagarajan | G06K 9/6262 |
| 2020/0076746 A1* | 3/2020 | Penrose | H04L 12/1822 |
| 2020/0110839 A1* | 4/2020 | Wang | G06F 16/93 |
| 2020/0117903 A1* | 4/2020 | Goel | G06K 9/6273 |
| 2020/0160098 A1* | 5/2020 | Irving | G06K 9/4642 |
| 2020/0167566 A1* | 5/2020 | Marder | G06N 20/00 |
| 2020/0175095 A1* | 6/2020 | Morariu | G06F 40/117 |
| 2020/0196011 A1* | 6/2020 | Wyatte | G06N 3/08 |
| 2020/0250537 A1* | 8/2020 | Li | G06F 16/9538 |
| 2020/0252372 A1* | 8/2020 | Bilsten | H04L 61/3025 |
| 2020/0265153 A1* | 8/2020 | Li | G06F 21/6218 |
| 2020/0265218 A1* | 8/2020 | Dai | G06N 20/00 |
| 2020/0272850 A1* | 8/2020 | Sakai | G06K 9/6215 |
| 2020/0311871 A1* | 10/2020 | Yu | G06T 3/4053 |
| 2020/0372047 A1* | 11/2020 | Wu | G06F 16/587 |
| 2020/0380067 A1* | 12/2020 | Religa | G06F 40/106 |
| 2021/0065859 A1* | 3/2021 | Mckinney | G16H 30/40 |

* cited by examiner

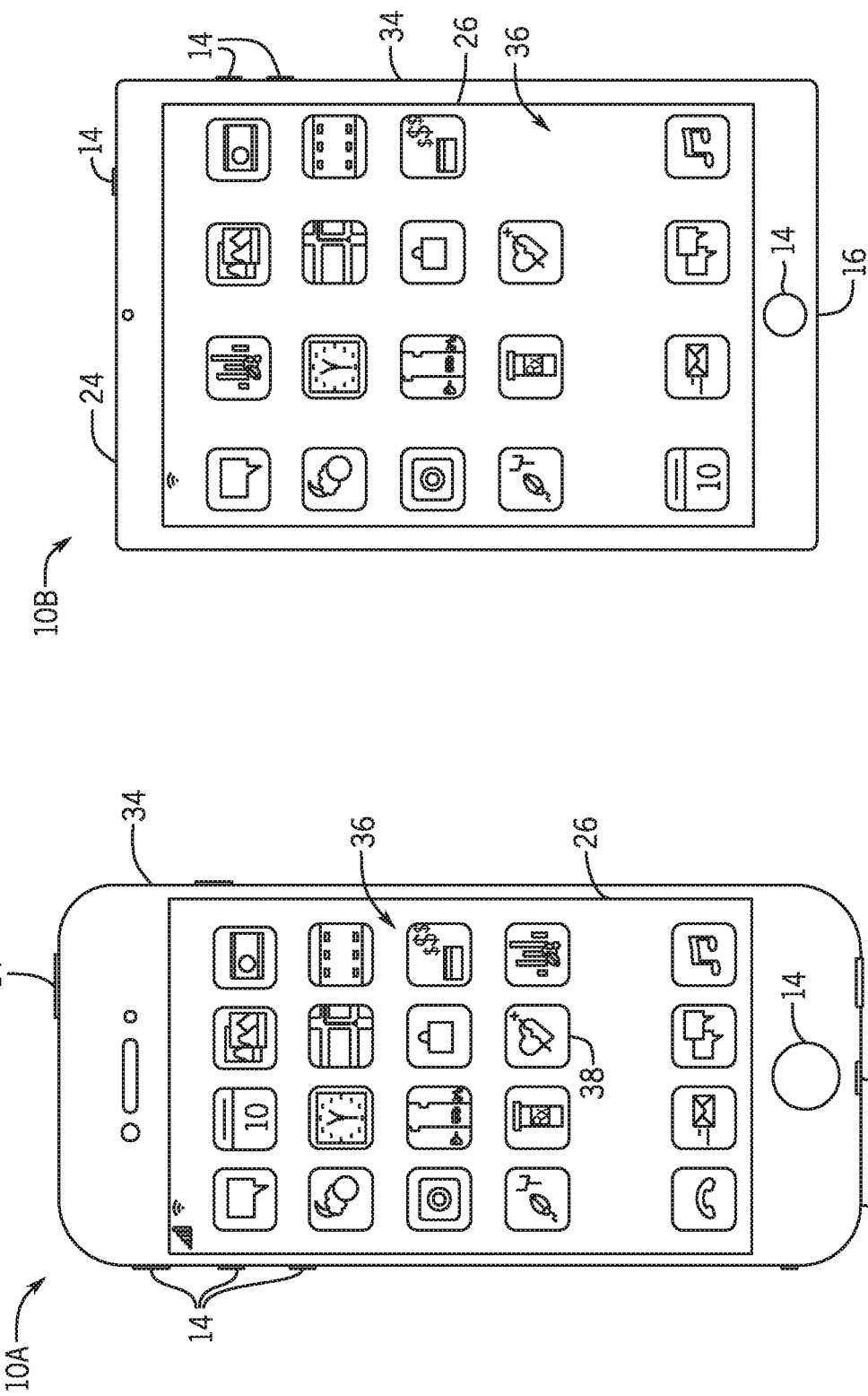

SYSTEMS AND METHODS FOR NAMING OBJECTS BASED ON OBJECT CONTENT

CROSS-REFERENCE TO RELATED APPLICATIONS

This application claims the benefit of U.S. Provisional Application No. 62/820,078, entitled "SYSTEMS AND METHODS FOR NAMING OBJECTS BASED ON OBJECT CONTENT," filed on Mar. 18, 2019, which is incorporated herein by reference in its entirety for all purposes.

BACKGROUND

The present disclosure relates generally to graphical user interfaces (GUIs) and, more particularly, to determining descriptive object names for display on the GUI.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as smartphones and laptops, often include a display that supports a graphical user interface (GUI). The GUI may enable a user to communicate with the electronic device by allowing the user to interact with graphical icons and visual indicators on the display. For example, a user may interact with a presentation application file using the presentation application icon. The user, in particular, may interact with multiple objects within the application to generate the application file. However, in instances when a relatively large number of objects are included in the application file, such as when objects are layered over one another, the user may have difficulty identifying and interacting with the appropriate objects to design the application file as intended.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to determining descriptive object names for display on a graphical user interface (GUI) by using machine learning to identify contents of the object(s) and generating the descriptive name(s) based on the contents. Application files, such as a presentation document, may include a variety of objects that are inserted and placed by the user. For example, a slide may include text object(s) and/or image object(s). To facilitate user interaction with the content of the application file, the application file may include an object list that lists the inserted objects using associated default names, which may be generic. As an example, image objects may be listed under the default name "image". When a relatively large number of objects are included in the application file, the user may have difficulty identifying objects via the default names displayed in the object list.

To improve user identification and interaction with objects included within the application file, in some embodiments, once an inserted object in the application file is detected, a machine learning content classifier may detect the contents of the object and may determine an appropriate classification label for the object based on the contents. When the classification label meets confidence and filter criteria, the electronic device may update metadata (e.g., object name) of the object to reflect the classification label. That is, the classification label may be used as the descriptive name. In some embodiments, when the confidence level and the filter criteria are not met, the object metadata may not be modified and the object name may remain the default name. Further, in some embodiments, when the user overrides a classification label generated by the content classifier with a user-defined name, the content classifier may output the user-defined name as the appropriate classification label (e.g., descriptive name) for objects with similar characteristics as the object whose classification label was replaced by the user-defined name.

BRIEF DESCRIPTION OF THE DRAWINGS

Various aspects of this disclosure may be better understood upon reading the following detailed description and upon reference to the drawings in which:

FIG. 2 is a front view of a hand-held device representing an example of the electronic device of FIG. 1, in accordance with an embodiment;

FIG. 3 is a front view of another hand-held device representing another example of the electronic device of FIG. 1, in accordance with an embodiment;

DETAILED DESCRIPTION OF SPECIFIC EMBODIMENTS

Figure 1:
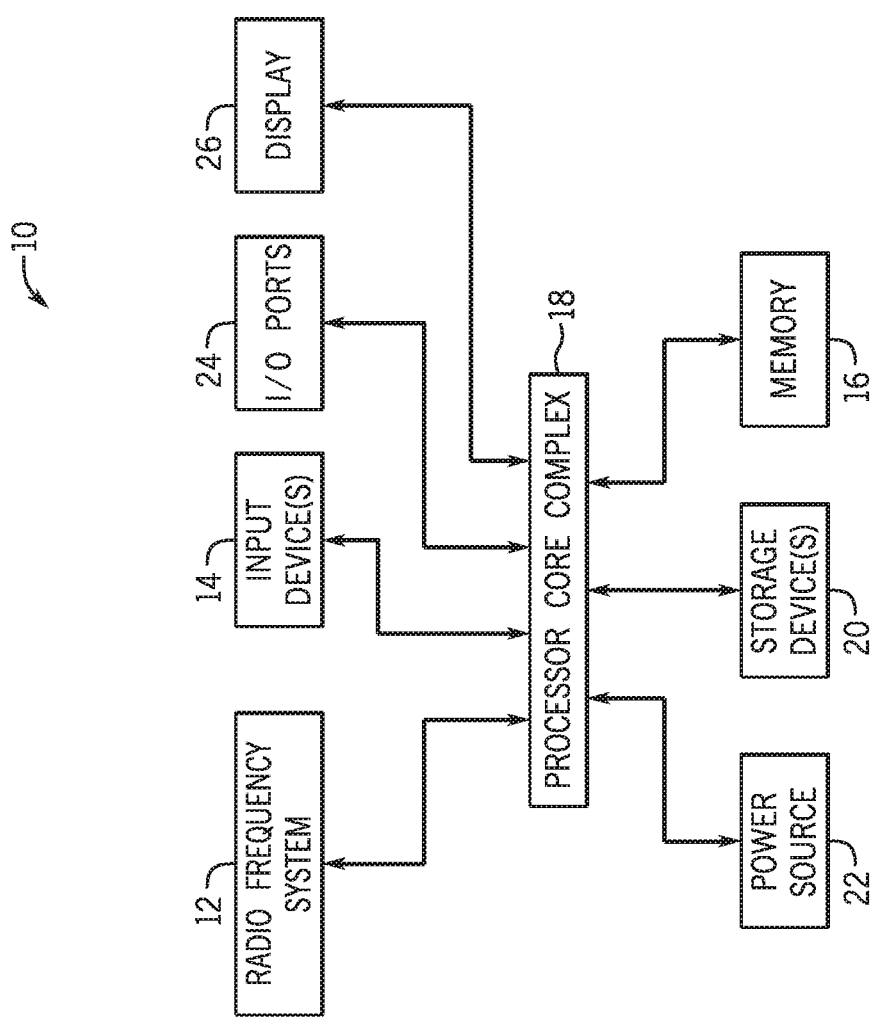
FIG. 1 is a block diagram of an electronic device that includes a graphical user interface, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to graphical user interfaces (GUIs) used to visually facilitate communication between a user and an electronic device. In particular, the user may interact with components of an application file using the GUI. For example, in an iWork® application, such as Keynote and Pages, the user may insert and place text objects, image objects, and/or shape objects within the application file to generate and design the application file.

To facilitate user interaction with the contents of the application file, the application file may include an object list that displays a list of the objects included in at least a portion of the application file. As an example, the object list may include a list of objects present in a slide of a presentation file and may be searched by the user for a particular object. Further, the objects may be listed in the object list using associated default name that are intended to be as descriptive as possible so that the user may easily find particular objects. For example, an image object may have a default name of its object type (e.g., "image") and a text object may have a default name of its object type (e.g., "text").

However, when the application file or the portion of the application file includes a relatively large number of objects, the object list may no longer assist the user in easily and quickly identifying a specific object. In particular, when default names are used to describe the objects in the object list, the default name may no longer be descriptive enough to efficiently identify the specific object within the application file. In other words, a search of the object list may result in multiple objects with a similar default name. For example, a user that may search "image" in the object list may receive a result of all image objects included within the application file or the portion of the application file.

Moreover, visually-impaired users may use a voiceover application to identify objects within the application file. The voiceover application may voice the metadata (e.g., name) of the object that the user hovers over or selects within the application file and/or the object list. However, when the application file includes multiple objects that have similar default names, as described above, the default name may no longer be descriptive enough to efficiently describe the object to the visually-impaired user.

Accordingly, the present disclosure provides systems and techniques to determine descriptive object names for efficient identification of objects within an application file. In some embodiments, the default name of each object may be made descriptive by updating the default name to a name based a description of the object contents (e.g., descriptive name). In particular, an electronic device implementing the application may detect an input to insert an object into the application file. The input may include copying and pasting, collaborations between application users, importing of an object without a name into the application file, and the like. Once the input is received, a machine learning content classifier may detect the contents of the object and determine an appropriate classification label for the object based on the contents.

In some embodiments, the content classifier may determine whether the classification label describes the contents of the object with high enough accuracy and whether to filter out the classification label from use, for example, because the label is derogatory or otherwise undesirable. When the accuracy (e.g., confidence level) and the filter criteria are met, the electronic device may update metadata (e.g., name metadata) of the object to reflect the classification label. The updated metadata may be stored in the application file for use later and the classification label may be displayed as the descriptive object name, replacing the default name.

In some embodiments, when the confidence level and/or the filter criteria are not met, the electronic device may refrain from modifying the object metadata, resulting in the object name remaining the default name. Additionally or alternatively, when the user overrides the descriptive name for a certain object with a user-defined name, the content classifier may use the user-defined name when generating descriptive names for objects with similar characteristics as that of the certain object. Further, if the user removes the user-defined name from use in the object list, the object name may be restored to the classification label and/or to the default name. Additional details with regard to providing descriptive object names for efficient identification of objects within the application file using the embodiments described herein are detailed below with reference to FIGS. 1-13.

With this in mind, an embodiment of an electronic device 10 that includes a graphical user interface (GUI) is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in the electronic device 10.

In the depicted embodiment, the electronic device 10 includes a radio frequency system 12, one or more input devices 14, local memory 16, a processor core complex 18, one or more main memory storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and a main memory storage device 20 may be included in a single component.

As depicted, the processor core complex 18 is operably coupled with the local memory 16 and the main memory storage device 20. Thus, the processor core complex 18 may execute instruction stored in the local memory 16 and/or the main memory storage device 20 to perform operations, such as instructing the electronic display 26 to display application icons that the user may interact with. As such, the processor core complex 18 may include one or more general purpose microprocessors, one or more application specific processors (ASICs), one or more field programmable logic arrays (FPGAs), or any combination thereof.

In addition to the instructions, the local memory 16 and/or the main memory storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 may be operably coupled with the radio frequency system 12. The radio frequency system 12 may facilitate wireless communication of data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a fourth-generation wireless technology (4G), 5G, or LTE cellular network. In other words, the radio frequency system 12 may enable wireless communication of data using various communication protocols and/or at various output powers (e.g., strength of transmitted analog electrical signals).

Additionally, as depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Further, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, the processor core complex 18 is operably coupled with the input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As mentioned previously, a user may interact with applications displayed on the GUI. In particular, the applications may include an object list that displays names of the objects inserted and placed by the user within an application file. Further, a voiceover application may voice the names of the objects inserted and placed by the user within the application file. Once the object is inserted in the application file, a machine learning content classifier may detect the contents of the object and determine an appropriate classification label for the object based on the contents. The default name of each object may be made more descriptive by updating the default names to a descriptive name based on the classification label.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the one or more antennas of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch sensing component of the electronic display 26, an application program may launch, such as a presentation application.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 4:
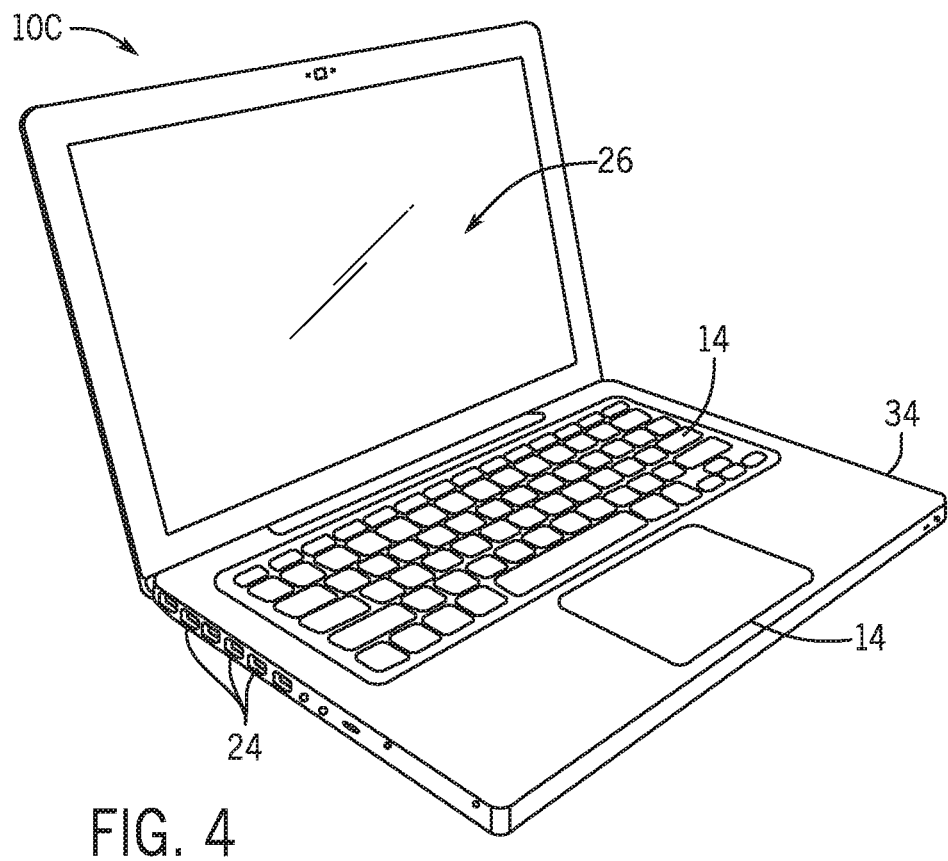
FIG. 4 is a perspective view of a notebook computer representing another example of the electronic device of FIG. 1, in accordance with an embodiment.
Figure 5:
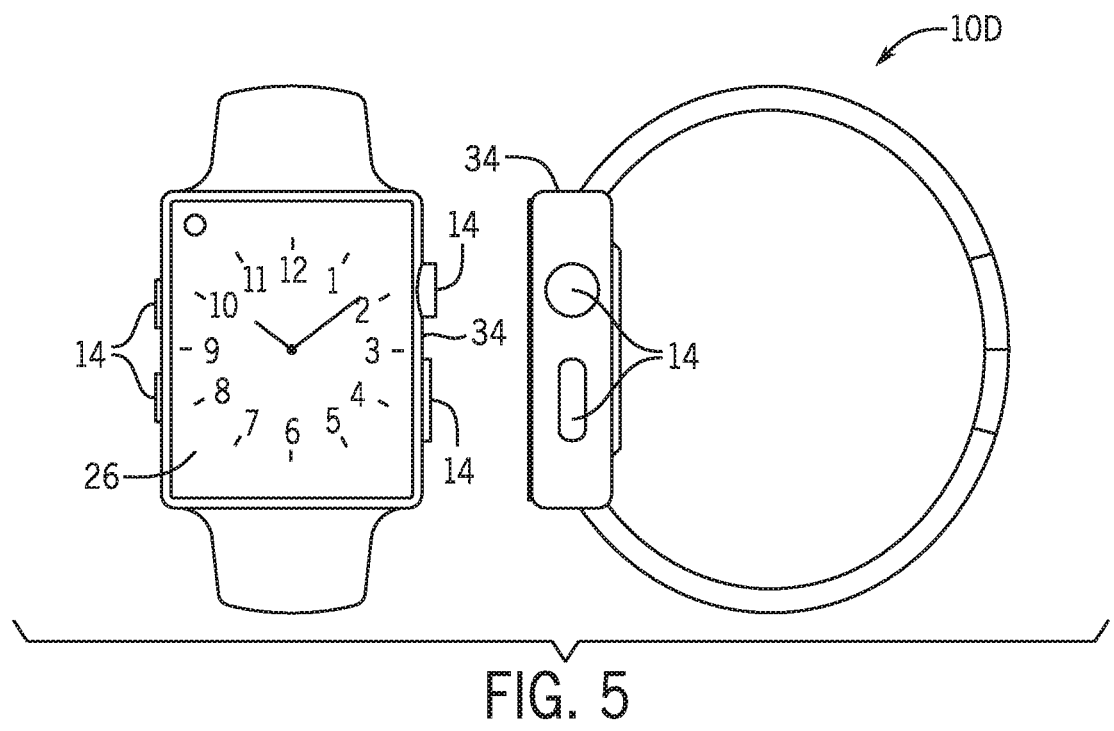
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D to facilitate wireless communication of data with other electronic devices and/or a network.

Figure 6:
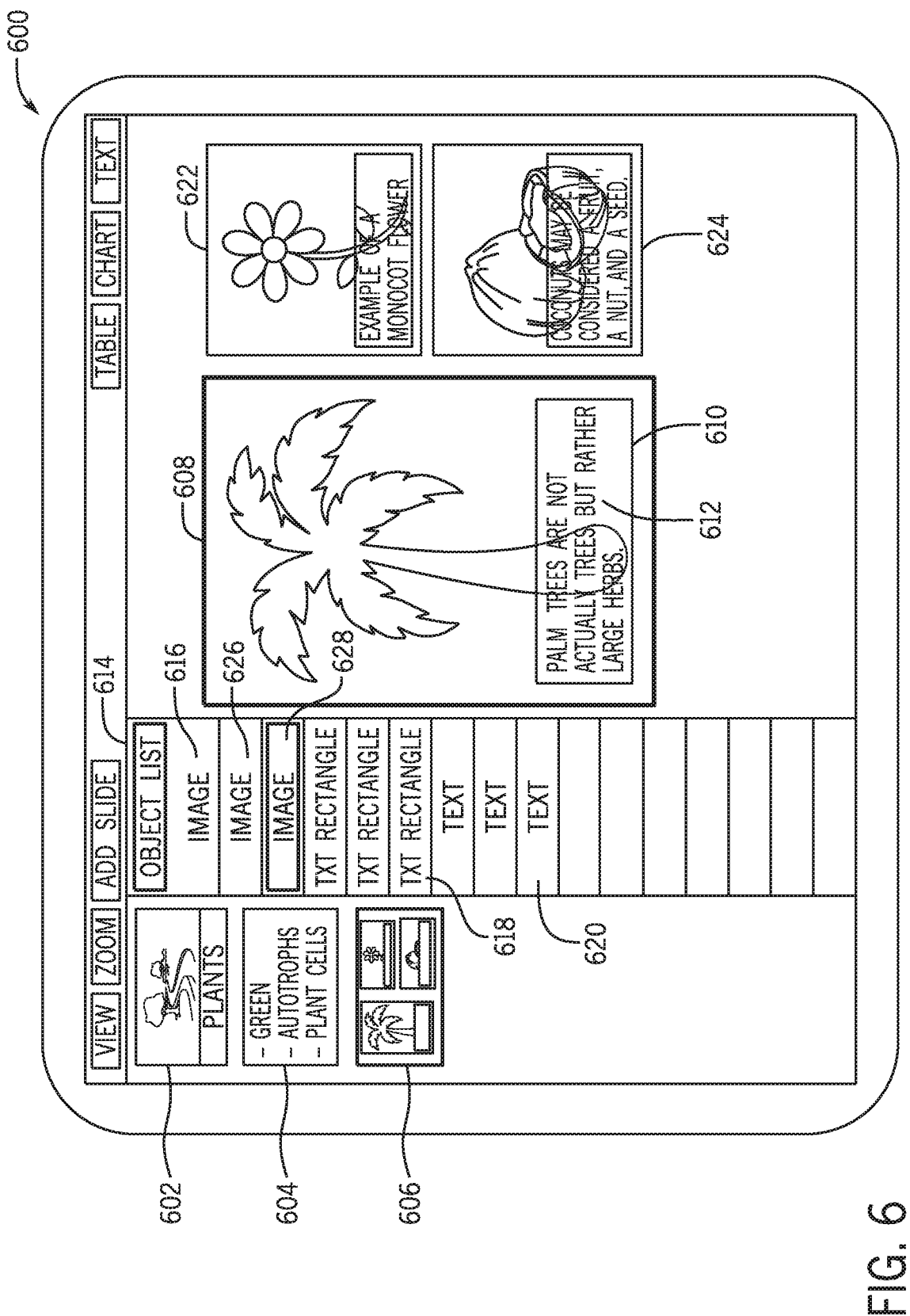
FIG. 6 is a schematic of an application file having an object list that displays default names for each object in the application file, in accordance with an embodiment.

To help illustrate determining descriptive object names for display on the GUI, FIG. 6 depicts a GUI 600 rendering an application file having an object list that displays default names for each object in the application file, in accordance with an embodiment. In particular, the application file may be a presentation file that, for example, includes three presentation slides 602, 604, 606. The user may choose a slide 606 for modification, as shown by the bolded indication. For example, the user may insert an image object 608, a shape object 610, and/or a text object 612 into the slide 606. Although the application file is depicted as a presentation file, it should be appreciated that the application file may be any type of file, such as a word processing file or a spreadsheet file.

The slide 606 may also include an object list 614 that displays a list of objects (e.g., 608, 610, 612) within the slide 606. As shown, the object list 614 may display default names for the objects (e.g., 608, 610, 612) within the slide 606, such that the default names are as descriptive as possible for easy and quick identification by the user. For example, the image objects (e.g., 608) may be listed under the name "image" 616, the shape objects (e.g., 610) under the name of their shape (e.g., "txt rectangle" 706), and the text objects (e.g., 612) under the name of "text" 620. Additionally or alternatively, when similar object types are included within the slide 606, the object list 614 may include sequential objects names, such as image1, image2, and the like. Further, when an object, such as the image object 608, is selected by the user, the associated object name 628 may be highlighted in the object list 614 to improve user interaction with the application content.

The object list 614 may also improve the ability of the user to easily and quickly identify and interact with the application content by enabling the user to perform a search within the object list 614 for a particular object. For example, the user may search for the keyword "image", which may generate a result that includes objects named "image". However, when multiple objects of the same object type or other similar characteristics are included within the slide 606, the search result may fail to provide accurate and narrowed search results. As an example, when the user searches for "image", the object list may display all image objects 608, 622, 624 on the slide 606 and their associated object names 616, 626, 628. Additionally, when the user uses the voiceover application to voice the name or description of a chosen object, the voiceover application may only be able to describe the object using the default object name. Since the default name may not be descriptive enough when multiple objects with similar characteristics are included within the slide 606, the voiceover application may not provide an accurate and identifying description of the chosen object.

Figure 7:
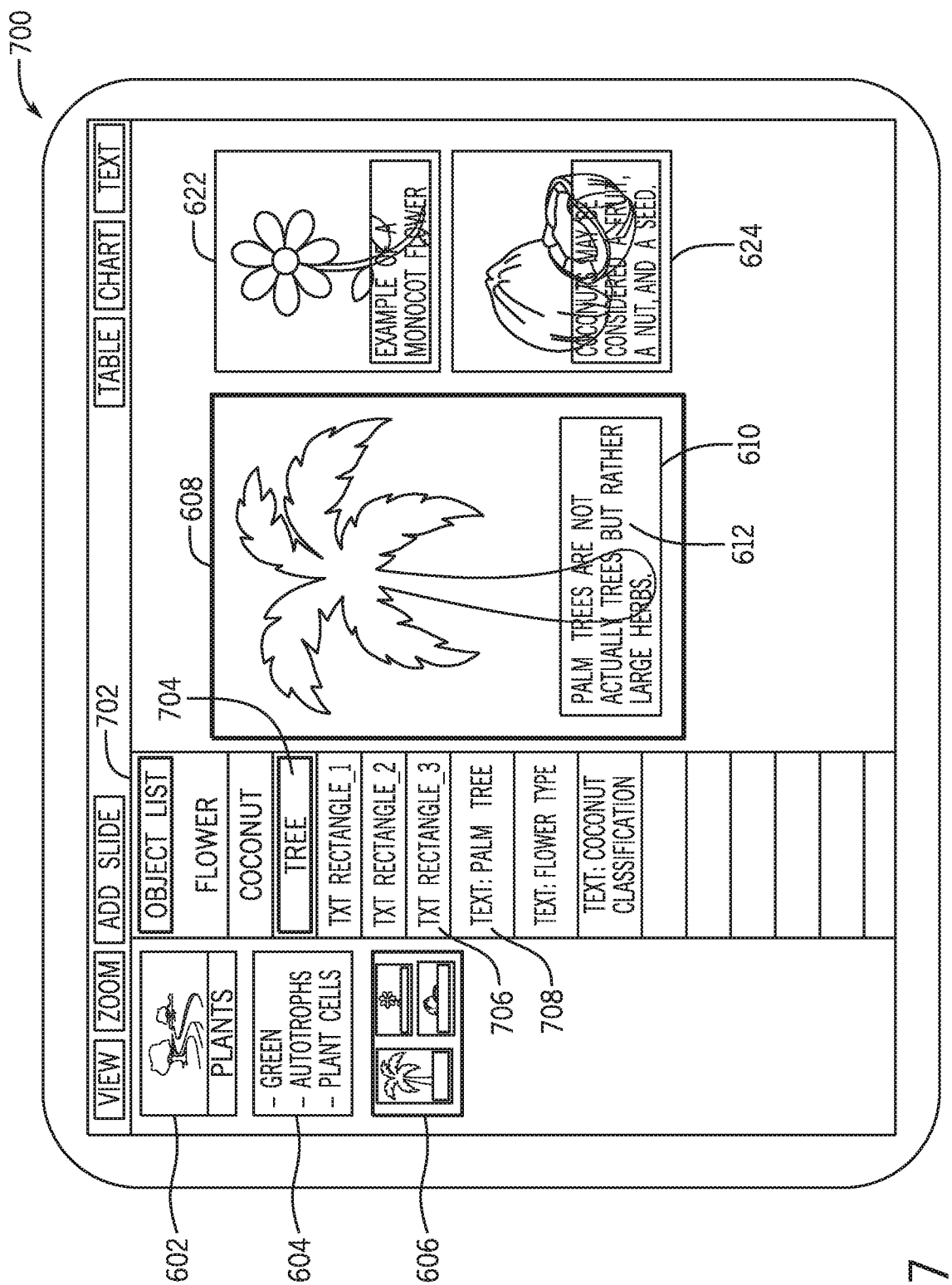
FIG. 7 is a schematic of the application file having an object list that displays descriptive names for each object in the application file, in accordance with an embodiment.

The default object names may be updated to a more descriptive name that facilitates the user's interaction with the application contents. FIG. 7 depicts a GUI 700 rendering an application file having an object list 702 that displays descriptive names for the objects based on the respective object contents, in accordance with an embodiment. In particular, the application may detect one or more inputs to insert an object into the application file. For example, the user may copy and paste or import the object 608 into the application file.

Once the application file receives the input, a content classifier may be applied to the object 608 to determine the contents of the object 608. The content classifier may be built into the operating system of the electronic device 10. Further, the content classifier may be trained using a set of object contents considered to be representative of classification labels a designer may want to display on the GUI. For example, the content classifier may be fed images of trees that adequately represent the classification label "tree." In addition, a subset of classification labels or terms in the classification labels that are deemed appropriate may be preselected and used to train the content classifier to recognize object content conforming to such approved classification labels. As such, the output of the content classifier may be accurate and may only include appropriate/desired classification labels. In some embodiments, the content classifier may applied to the object 608 as soon as the object 608 is inserted into the application file or once a group of other objects (e.g., 622, 624) that also have been inserted into the application file.

The content classifier may determine an appropriate classification label for the object 608 based on the contents within the object 608. For example, the content classifier may determine that the object 608 includes a palm tree and thus, may output classification labels of tree and/or palm tree. Before outputting the classification label to the application file, the content classifier may determine whether the classification label(s) describes the contents of the object 608 with high enough accuracy (e.g., confidence). For example, the content classifier may determine an 80% confidence level for the classification label "tree" and a 30% confidence level for the classification label "palm tree". The content classifier may select, as the output, the classification label that has the highest confidence level when multiple classification labels have been determined and/or may select the classification label whose confidence level is greater than or equal to a predetermined confidence threshold. As such, the content classifier may provide classification labels of greater accuracy and/or specificity.

For text objects 612, the content classifier may use keywords from the text and/or associations with other objects to determine classification label(s) that best describes the subject of the text. For example, the content classifier may evaluate proper nouns and verbs within the text. As another example, the content classifier may evaluate metadata (e.g., name, caption) of objects associated with the text object 612 to determine the classification label(s) that best describes the subject of the text.

For other objects, such as videos, the content classifier may perform an image classification on one or more frames of the video to determine a classification label that appropriately describes the contents of the video. As an example, when a first frame of the video includes a waterfall and a second frame of the video includes a cliff, the content classifier may output a classification label of "landscape." Regardless of the object type, the content classifier may determine a confidence for each generated classification label and may output the appropriate classification label for the object.

Once the classification label is generated, the electronic device 10 may update metadata (e.g., name metadata) of the object 608 to reflect the classification label. In particular, the classification label may be stored in the application file and the classification label may be displayed as the descriptive object name. For example, the content classifier may output the classification label "tree" as the most appropriate classification label for the object 608 and the object name may be updated to "tree". As shown, the updated object name for the object 608 may be included in the object list 702.

In addition, the content classifier may output classification labels for the other objects 610, 612, such as "Txt Rectangle 3" 706 and "Text: Palm Tree" 708, respectively. In some embodiments, the content classifier may output these classification labels by identifying words (e.g., proper nouns) that tend to suggest a particular classification for the word. Further, the content classifier may use metadata (e.g., name) of objects, such as image objects, associated with the object (e.g., 610, 612) to determine the appropriate classification labels. Thus, the name of the object may be updated to provide an indication of the subject matter of the object (e.g., 610, 612). Additionally or alternatively, in some embodiments, the updated metadata may follow the object (e.g., 608) and be used to populate corresponding fields when, for example, the object (e.g., 608) is exported to another application file. Further, the voiceover applications may voice the more descriptive, updated object name to better describe objects to, for example, a visually-impaired user.

Figure 8:
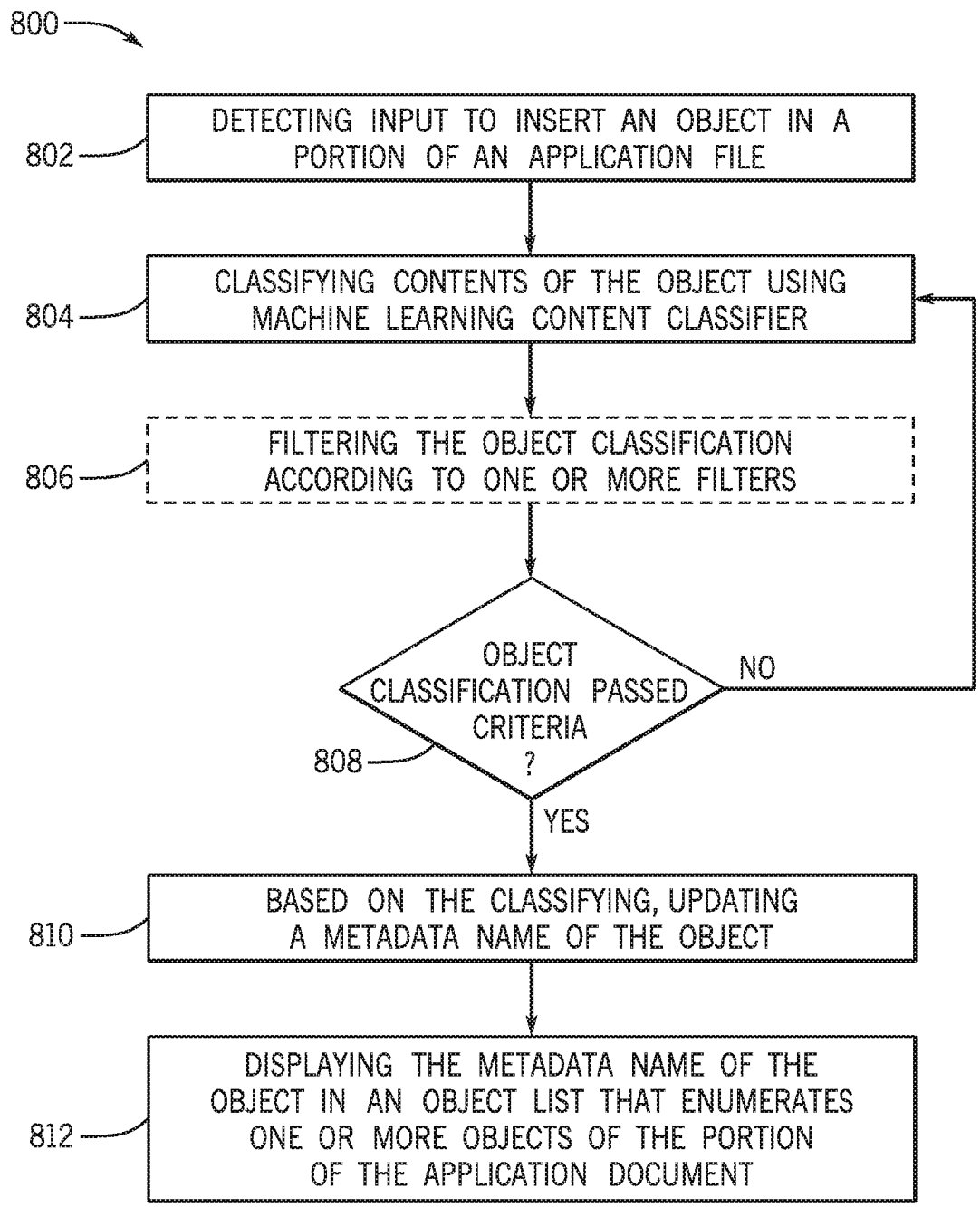
FIG. 8 is a process for determining the descriptive names for each object in the application file of FIG. 7 based on object content, in accordance with an embodiment.

FIG. 8 summarizes a process 800 for determining the descriptive names for each object in the application file based on the object content, in accordance with an embodiment. While process 800 is described according to a certain sequence, it should be understood that the present disclosure contemplates that the described steps may be performed in different sequences than the sequence illustrated, and certain described steps may be skipped or not performed altogether. In some embodiments, the process 800 may be implemented at least in part by executing instructions stored in a tangible, non-transitory, computer-readable medium, such as the memory 20, using processing circuitry, such as the processor core complex 18. Additionally or alternatively, the process 800 may be implemented at least in part by circuit connections and/or control logic implemented in an electronic device 10.

The process 800 may be initiated when the processor core complex 18 of the electronic device 10 detects an input to insert the object (e.g., 608) in a portion of an application file (e.g., the slide 606) (process block 802). As previously discussed, the input may include the user copying and pasting the object 608 into the application file and/or importing the object 608 into the application file. The processor core complex 18 may subsequently classify contents of the object 608 by instructing the application to apply the content classifier to the object 608 as soon as the object 608 is inserted into the application file or with a group of objects included in the application file (process block 804). The content classifier may determine one or more classification labels that describe the contents of the object 608 along with a confidence level for each classification label.

The processor core complex 18 may also instruct the content classifier to filter the one or more classification labels according to one or more predetermined filters stored in the application or content classifier or according to one or more user-defined filters (process block 806). For example, the filters may remove classification labels related to politics or that are derogatory. The processor core complex 18 may subsequently instruct the content classifier to determine whether a classification label determined by the content classifier has passed the confidence level and filter criteria (decision block 808).

When no classification labels have passed the criteria, the content classifier may be reapplied to the object (e.g., 608) to determine another set of classification labels. In some embodiments, when no classification labels have passed the criteria, the default name may be used to populate the object list 702 rather than a descriptive name based on the classification label. When a classification label has passed the criteria, the processor core complex 18 may update the metadata of the object based on the classification label by instructing the application file to store the classification label as the object name (process block 810). Once the object name has been updated, the classification label may be displayed as the descriptive name in the object list 702 (process block 812).

Figure 9:
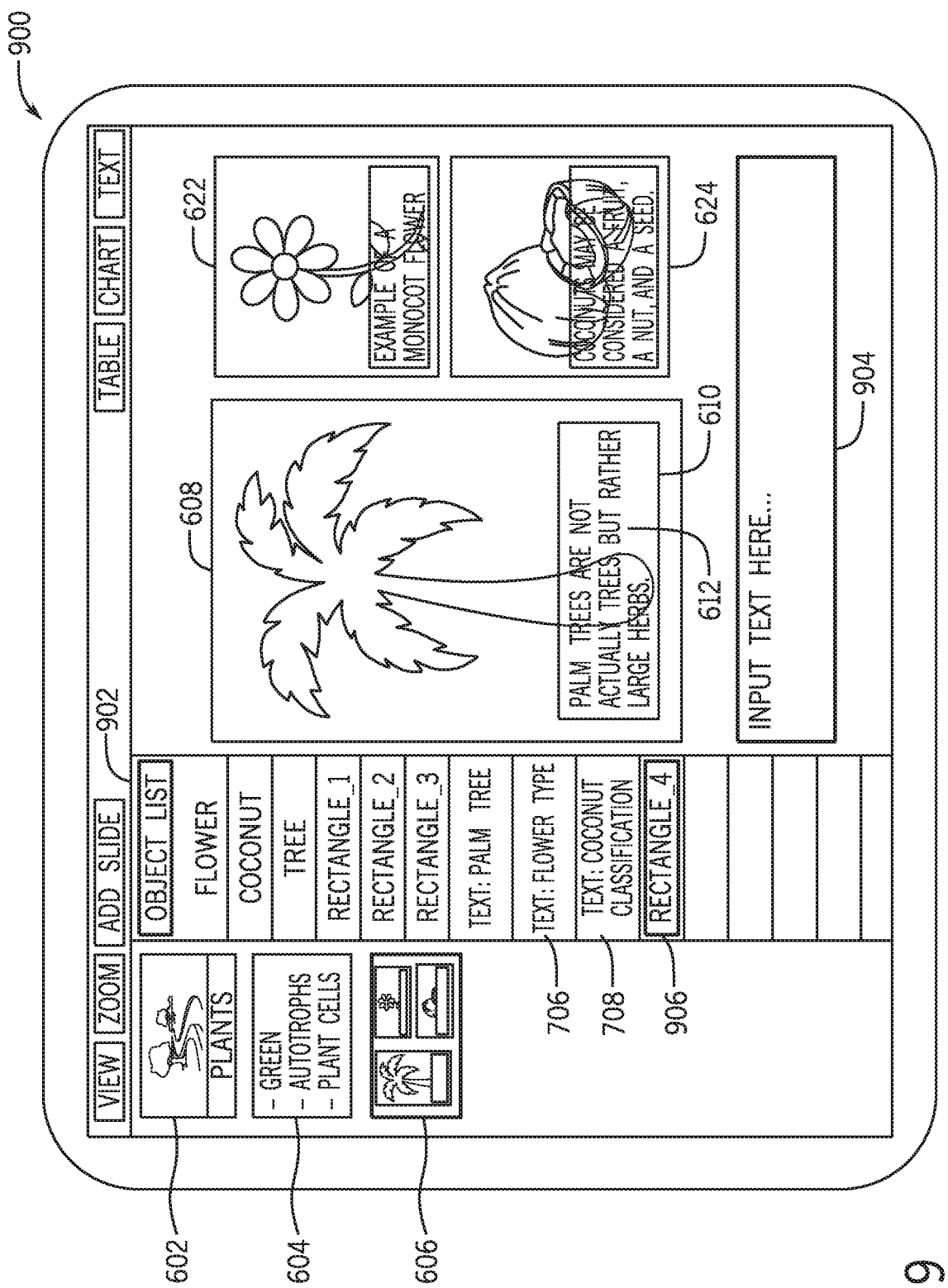
FIG. 9 is a schematic of an application file having an object list that displays user-defined names for certain objects in the application file, in accordance with an embodiment.

The user may choose to override one or more classification labels based on personal preference and instead use a user-defined name for objects associated with the one or more classification labels. FIG. 9 depicts a GUI 900 rendering an application file that has an object list 902 which displays user-defined names, in accordance with an embodiment. In particular, the user may prefer using a user-defined name for certain objects or object types as compared to the default name or the descriptive name generated by the content classifier. When the user chooses to override the descriptive name using the user-defined name, the content classifier may learn the user's preference and automatically output the user-defined metadata for similar objects instead of the content-based classification label.

As an example, the user may prefer to use the description "rectangle" to describe the shape objects (e.g., 610) used within the slide 606. When the user inserts another shape object 904 into the application file, the content classifier may use the description "rectangle" to describe the newly inserted shape object 904. As shown, the object list 902 may include the object name "Rectangle_4" to describe the shape object 904.

In some embodiments, the user-defined name may be used even when the object (e.g., 904) is exported from the application file and/or when the content classifier version is updated, such as with an update of the application supporting the application file. Further, if the user elects to remove the user-defined names from use in the object list 902 and/or use in the voiceover application, the classification labels for each object may be restored, if available. In addition, if the user elects to remove the classification labels from use in the object list 902 and/or use in the voiceover application, the default names for each object may be restored.

Figure 10:
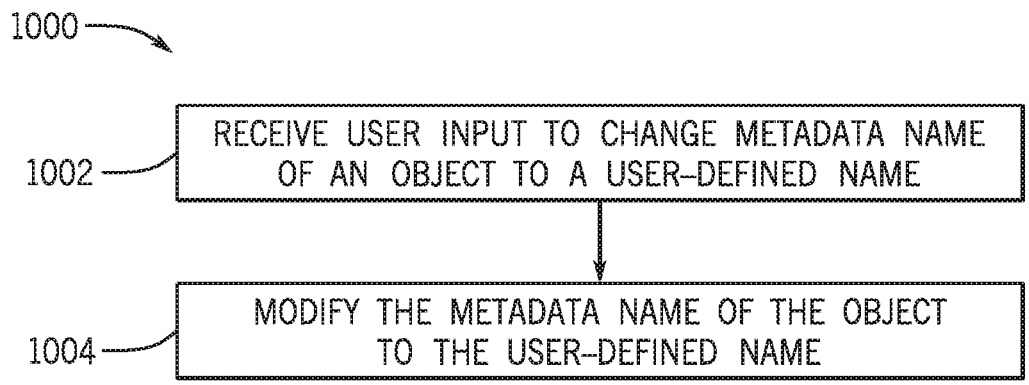
FIG. 10 is a process for modifying the descriptive name of the certain objects in the application file of FIG. 9 based on the user-defined name, in accordance with an embodiment.

FIG. 10 depicts a process 1000 for determining the descriptive name of the objects based on the user-defined name for the object (e.g., 610, 904), in accordance with an embodiment. While the process 1000 is described according to a certain sequence, it should be understood that the present disclosure contemplates that the described steps may be performed in different sequences than the sequence illustrated, and certain described steps may be skipped or not performed altogether. In some embodiments, the process 1000 may be implemented at least in part by executing instructions stored in a tangible, non-transitory, computer-readable medium, such as the memory 20, using processing circuitry, such as the processor core complex 18. Additionally or alternatively, the process 1000 may be implemented at least in part by circuit connections and/or control logic implemented in an electronic device 10.

The process 1000 may begin when the application file receives a user input to change metadata (e.g., name metadata) of an object to the user-defined name, as described above (process block 1002). For example, the user may elect to rename the shape objects 610, 904 with the name "rectangle". Upon receiving the user input to change the object name metadata, the processor core complex 18 may instruct the application to modify the object name to the user-defined name (process block 1004).

Figure 11:
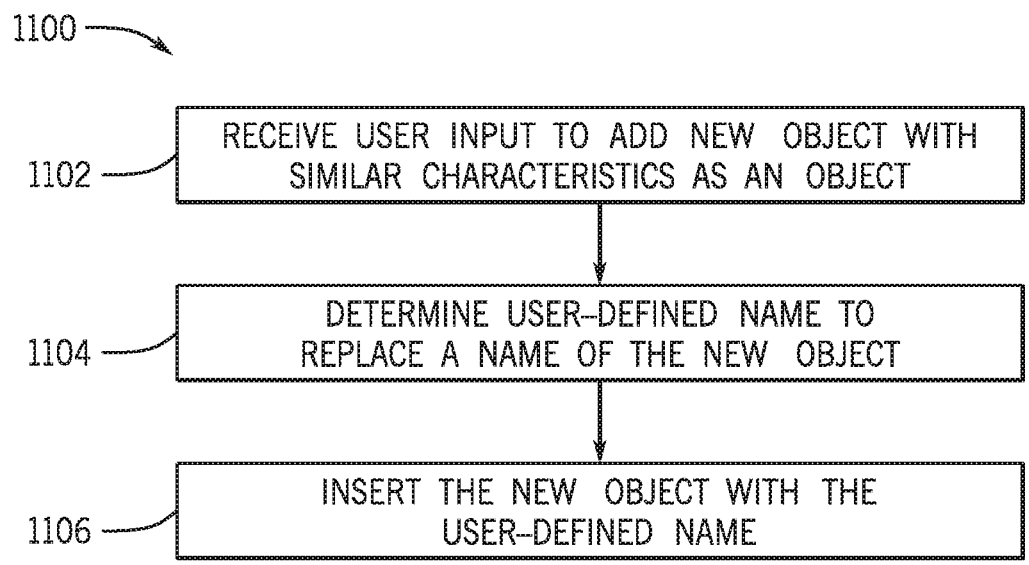
FIG. 11 is a process for automatically updating the descriptive name of the certain objects in the application file of FIG. 9 using the user-defined name for the certain objects, in accordance with an embodiment.

In addition, FIG. 11 depicts a process 1100 for automatically updating the name of the object (e.g., 904) using the user-defined name for objects (e.g., 610, 904) of a similar type, in accordance with an embodiment. While process 1100 is described according to a certain sequence, it should be understood that the present disclosure contemplates that the described steps may be performed in different sequences than the sequence illustrated, and certain described steps may be skipped or not performed altogether. In some embodiments, the process 1100 may be implemented at least in part by executing instructions stored in a tangible, non-transitory, computer-readable medium, such as the memory 20, using processing circuitry, such as the processor core complex 18. Additionally or alternatively, the process 1100 may be implemented at least in part by circuit connections and/or control logic implemented in an electronic device 10.

Generally, the process 1100 may be initiated when the application receives an input to add a new object that has similar characteristics as an object whose metadata, and thus descriptive name, has been modified to a user-defined name (process block 1102). For example, the user may indicate that he/she wants to insert the shape object 904, which has similar characteristics (e.g., object content, shape, color) to other shape objects (e.g., 610) in the application file. The processor core complex 18 may then instruct the content classifier to determine the user-defined name to replace the name of the new object (e.g., 904) (process block 1104). In particular, the content classifier may determine the objects (e.g., 610) that are to the new object (e.g., 904) and use the user-defined name associated with these object (e.g., 610) to determine the appropriate user-defined name (e.g., "rectangle") for the new object (e.g., 904). The processor core complex 18 may then instruct the application to insert the new object (e.g., 904) into the application file with metadata that is updated with the user-defined name (process block 1106).

Figure 12:
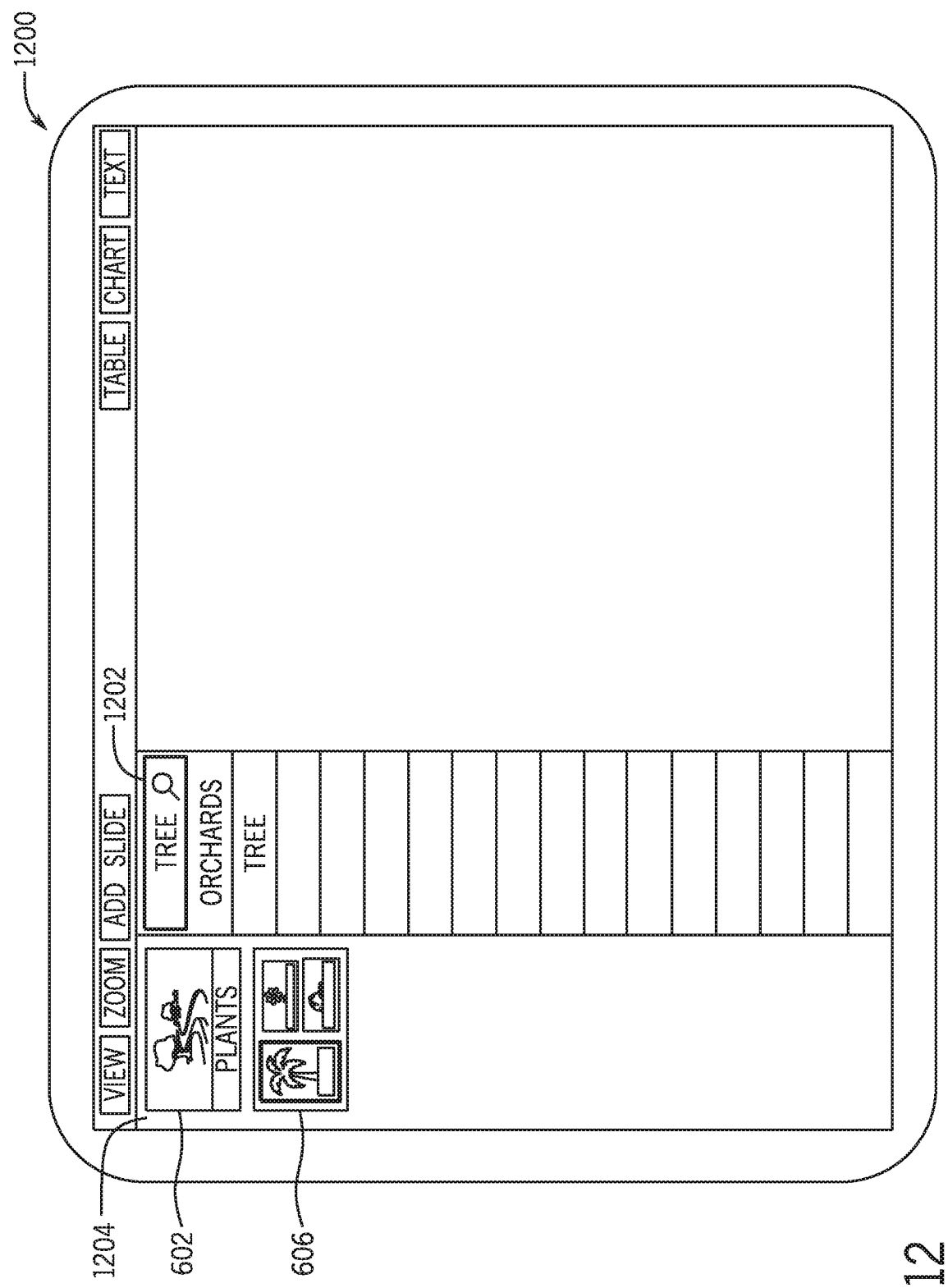
FIG. 12 is a schematic of an application file that includes indications of objects with object names related to a keyword search performed on the object list, in accordance with an embodiment.

To further facilitate quick and simple identification of objects in the application file by the user, the object list may be searchable and the objects that fit the results may be indicated in the application file. FIG. 12 depicts a GUI 1200 rendering an application file that includes indications of objects that have object names related to a keyword searched in the object list 1202, in accordance with an embodiment. As shown, the user may perform a search in the object list 1202, such as for the keyword "tree". The application and/or the content classifier may analyze the names of each object included within the application file or a portion of the application file and may determine the object names that are related to the keyword. For example, the application and/or the content classifier may determine that object names "orchards" and "tree" are related to the keyword "tree". The application file may then be updated to reflect the search results. For example, the object list 1202 may be updated with the object names "orchards" and "tree". Further, indications (e.g., bold highlighting) may be generated around the slide and/or the objects that are associated with the related object names. Additionally or alternatively, in some embodiments, slides (e.g., slide 604) that do not show objects with the object names related to the keyword may be filtered from the preview bar 1204 to make it easier and faster for the user to find the location of the objects with the related object names.

Figure 13:
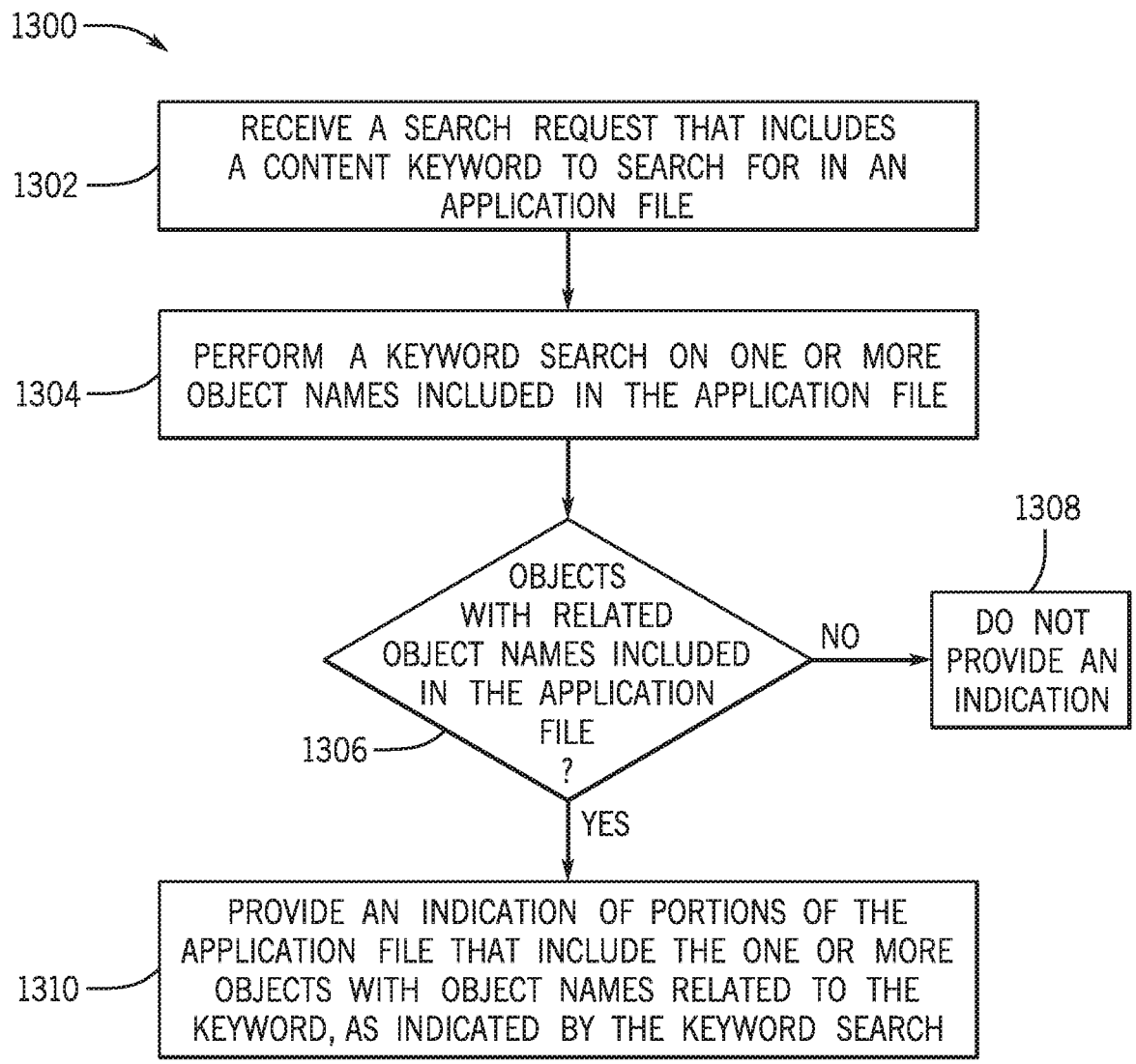
FIG. 13 is a process for generating the indication of the objects with object names related to the keyword search performed on the object list of FIG. 12, in accordance with an embodiment.

FIG. 13 illustrates a process 1300 for generating the indication of the objects with object names that are related to the keyword search performed on the object list 1202, in accordance with an embodiment. While process 1300 is described according to a certain sequence, it should be understood that the present disclosure contemplates that the described steps may be performed in different sequences than the sequence illustrated, and certain described steps may be skipped or not performed altogether. In some embodiments, the process 1300 may be implemented at least in part by executing instructions stored in a tangible, non-transitory, computer-readable medium, such as the memory 20, using processing circuitry, such as the processor core complex 18. Additionally or alternatively, the process 1300 may be implemented at least in part by circuit connections and/or control logic implemented in an electronic device 10.

The process 1300 may begin when the application receives a search request from the user that includes a content keyword to search for in the application file (process block 1302). For example, and as described above, the user may search for the content keyword "tree" in the application file. The processor core complex 18 may then instruct the application and/or the content classifier to perform a keyword search on one or more object names included in the application file (process block 1304). The processor core complex 18 may then determine whether there are any objects with object names related to the keyword included in the application file (decision block 1306). When no objects with object names are related to the keyword included in the application file, no indication (e.g., empty search result in the object list, no bold highlighting) may be provided to the user (process block 1308). When objects with object names are related to the keyword included in the application file, an indication of portions of the application file that include these objects may be provided to the user, as described above (process block 1310).

As such, the present technique may automatically provide more accurate and narrow results of searches performed on objects within the object list, may automatically provide better descriptions of the objects included in the application, and may improve accessibility and navigation of the application file for, for example, visually-impaired users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
    detecting an input to insert an object into a slide of a presentation file via graphical user interface (GUI) of an application, wherein the object includes content;
    in response to detecting the input into the slide;
        insert the object into the slide, the object having a metadata name comprising an indication of a type of the object, and providing the object to a content classifier;
receiving a classification label for the object from the content classifier, wherein:
when the object comprises a text, the classification label comprises a description of subject matter of the text based upon an evaluation of a meaning of one or more words of the text, and
the classification label is based at least in part on an association between the object and one or more additional objects in the slide, the one or more additional objects comprising a second object with a different object type than the object;
updating in the application, the metadata name of the object to an updated metadata name, based upon the classification label; and
displaying, in lieu of the metadata name, the updated metadata name of the object in an object list of the presentation file, wherein the object list enumerates a plurality of objects present within the slide.

2. The method of claim 1, comprising filtering the classification label according to one or more predefined filters, one or more user-defined filters, or a combination thereof, for filtering out derogatory language, metadata names previously overridden, or any combination thereof.

3. The method of claim 1, wherein the classification label is based upon the metadata name of the object, a caption associated with the object, or both.

4. The method of claim 1, wherein updating the metadata name of the object comprises replacing the metadata name correctly describing the object with a more specific name correctly describing the object with relatively more detail.

5. The method of claim 1, wherein the evaluation of the meaning of the one or more words of the text comprises an identification and analysis of nouns, verbs, or both, of the one or more words.

6. The method of claim 1, wherein when the object comprises an image, the classification label is based on subject matter contained in the image.

7. The method of claim 1, wherein the different object type comprises an image object type.

8. The method of claim 1, wherein the object comprises a text object and the classification label is based at least in part upon an image object on the slide.

9. An electronic device, comprising:
a graphical user interface (GUI) configured to display a slide of a presentation file;
a processor configured to execute instructions to:
detect an input to insert an object into the slide via the GUI of an application, wherein the object includes content;
in response to detecting the input, insert the object into the slide, the object having a metadata name comprising an indication of a type of the object, and provide the object to a content classifier;
receive a classification label for the object from the content classifier, wherein:
when the object comprises a text, the classification label comprises a description of subject matter of the text based upon an evaluation of a meaning of one or more words of the text, and
the classification label is based at least in part on an association between the object and one or more additional objects in the slide, independent of a user input classifying the one or more additional objects;
update in the application, the metadata name of the object to an updated metadata name, based upon the classification label; and
display, in lieu of the metadata name, the updated metadata name of the object in an object list of the presentation file, wherein the object list enumerates a plurality of objects present within the slide.

10. The electronic device of claim 9, wherein the classification label is based upon the metadata name of the object a caption associated with the object, or both.

11. The electronic device of claim 9, wherein updating the metadata name of the object comprises replacing the metadata name correctly describing the object with a more specific name correctly describing the object with relatively more detail.

12. The electronic device of claim 9, wherein the evaluation of the meaning of the one or more words of the text comprises an identification and analysis of nouns, verbs, or both, of the one or more words.

13. The electronic device of claim 9, wherein when the one or more additional objects comprise an image, the classification label is based on subject matter contained in the image.

14. A tangible, non-transitory computer-readable medium configured to store a program for determining object names based on object content, the program comprising instructions to:
detect an input to insert an object into a slide of a presentation file via graphical user interface (GUI) of an application, wherein the object includes content;
in response to detecting the input into the slide, insert the object into the slide, the object having a metadata name comprising an indication of a type of the object, and provide the object to a content classifier;
receive a classification label for the object from the content classifier, wherein:
when the object comprises a text, the classification label comprises a description of subject matter of the text based upon an evaluation of a meaning of one or more words of the text, and
the classification label is based at least in part on a presentation file association between the object and one or more additional objects in the slide, the presentation file association indicating that the one or more additional objects provide context to the object;
update in the application, the metadata name of the object to an updated metadata name, based upon the classification label; and
display, in lieu of the metadata name, the updated metadata name of the object in an object list of the presentation file, wherein the object list enumerates a plurality of objects present within the slide.

15. The tangible, non-transitory computer-readable medium of claim 14, comprising instructions to filter the classification label according to one or more predefined filters, one or more user-defined filters, or a combination thereof, for filtering out derogatory language, metadata names previously overridden, or any combination thereof.

16. The tangible, non-transitory computer-readable medium of claim 14, wherein the classification label is based upon the metadata name of the object, a caption associated with the object, or both.

17. The tangible, non-transitory computer-readable medium claim 14, wherein updating the metadata name of the object comprises replacing the metadata name correctly describing the object with a more specific name correctly describing the object with relatively more detail.

18. The tangible, non-transitory computer-readable medium claim 14, wherein the evaluation of the meaning of the one or more words of the text comprises an identification and analysis of nouns, verbs, or both, of the one or more words.

19. The tangible, non-transitory computer-readable medium claim 14, wherein when the one or more additional objects comprise an image, the classification label is based on subject matter contained in the image.

20. The tangible, non-transitory computer-readable medium claim 14, wherein the presentation file association comprises a placement of the object and the one or more additional objects indicating that the one or more additional objects provide a context to the object.

* * * * *